(12) United States Patent
Freienstein et al.

(10) Patent No.: US 9,446,685 B2
(45) Date of Patent: Sep. 20, 2016

(54) METHOD FOR ACTIVATING A SAFETY ACTUATOR OF A MOTOR VEHICLE

(71) Applicant: Robert Bosch GmbH, Stuttgart (DE)

(72) Inventors: Heiko Freienstein, Weil der Stadt (DE); Marcel Maur, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/349,612

(22) PCT Filed: Sep. 25, 2012

(86) PCT No.: PCT/EP2012/068820
§ 371 (c)(1),
(2) Date: Apr. 3, 2014

(87) PCT Pub. No.: WO2013/053591
PCT Pub. Date: Apr. 18, 2013

(65) Prior Publication Data
US 2014/0330484 A1    Nov. 6, 2014

(30) Foreign Application Priority Data

Oct. 10, 2011   (DE) .................. 10 2011 084 204

(51) Int. Cl.
| | | |
|---|---|---|
| *B60R 21/01* | (2006.01) | |
| *B60N 2/00* | (2006.01) | |
| *B60R 21/015* | (2006.01) | |

(Continued)

(52) U.S. Cl.
CPC .............. *B60N 2/002* (2013.01); *B60N 2/0232* (2013.01); *B60N 2/0276* (2013.01); *B60R 21/013* (2013.01); *B60R 21/015* (2013.01); *B60R 21/01554* (2014.10); *B60R 2021/01313* (2013.01)

(58) Field of Classification Search
None
See application file for complete search history.

(56) References Cited

U.S. PATENT DOCUMENTS

| | | | | |
|---|---|---|---|---|
| 5,626,359 A | * | 5/1997 | Steffens, Jr. | .......... B60R 21/013 180/268 |
| 5,785,347 A | * | 7/1998 | Adolph | ............. B60R 21/01556 180/273 |
| 6,164,693 A | * | 12/2000 | Mattes | ................... B60K 28/12 180/272 |

(Continued)

FOREIGN PATENT DOCUMENTS

| | | |
|---|---|---|
| CN | 1692028 A | 11/2005 |
| DE | 103 05 013 | 8/2004 |

(Continued)

OTHER PUBLICATIONS

International Search Report for PCT/EP2013/068820, dated Nov. 30, 2012.

(Continued)

*Primary Examiner* — Jonathan M Dager
(74) *Attorney, Agent, or Firm* — Norton Rose Fulbright US LLP (57) ABSTRACT

A method for activating a safety actuator of a motor vehicle includes: ascertaining an endangerment model of the motor vehicle with the aid of an anticipatory sensor system and at least one characteristic value of a pose of a driver of the motor vehicle; ascertaining a controllability of the motor vehicle by a driver of the motor vehicle with the aid of the at least one characteristic value; and activating the safety actuator to an extent which is a function of the endangerment model and the controllability.

15 Claims, 5 Drawing Sheets

(51) Int. Cl.
  *B60R 21/013* (2006.01)
  *B60N 2/02* (2006.01)

(56) References Cited

U.S. PATENT DOCUMENTS

| | | | |
|---|---|---|---|
| 6,186,537 B1 | 2/2001 | Breed et al. | |
| 6,219,605 B1* | 4/2001 | Bauer | B60R 21/015 180/268 |
| 6,282,473 B1* | 8/2001 | Steffens, Jr. | B60R 21/01546 180/272 |
| 6,416,080 B1* | 7/2002 | Gillis | B60R 21/01508 280/735 |
| 6,513,830 B2* | 2/2003 | Breed | B60N 2/002 180/271 |
| 6,626,460 B2* | 9/2003 | Aoki | B60R 21/01546 280/735 |
| 6,640,175 B2* | 10/2003 | Vos | B60R 21/01516 180/268 |
| 6,708,095 B2* | 3/2004 | Prakah-Asante | B60R 21/0132 701/45 |
| 6,758,495 B2* | 7/2004 | Brambilla | B60R 21/01558 180/268 |
| 6,808,200 B2* | 10/2004 | Drobny | B60R 21/01516 177/136 |
| 6,819,991 B2* | 11/2004 | Rao | B60R 21/013 180/274 |
| 6,901,321 B1* | 5/2005 | Nitschke | B60R 21/01 180/274 |
| 7,138,909 B2* | 11/2006 | Winner | B60K 31/0008 340/436 |
| 7,315,002 B2* | 1/2008 | Hofbeck | B60R 21/01534 177/136 |
| 7,383,113 B2* | 6/2008 | Marchthaler | B60R 21/01516 180/271 |
| 7,489,994 B2* | 2/2009 | Isono | F02D 41/1401 340/438 |
| 7,568,544 B2* | 8/2009 | Hirota | B60N 2/42736 180/274 |
| 7,712,776 B2* | 5/2010 | Prakah-Asante | B60R 21/013 280/735 |
| 7,720,585 B2* | 5/2010 | Fukuda | B60R 21/013 180/268 |
| 7,912,605 B2* | 3/2011 | Meister | B60R 21/0132 701/41 |
| 8,019,509 B2* | 9/2011 | Bernzen | B60R 21/0132 280/806 |
| 8,150,583 B2* | 4/2012 | Danner | B60R 21/0134 180/167 |
| 8,251,397 B2* | 8/2012 | Tabe | B60R 21/0152 280/728.1 |
| 8,321,092 B2* | 11/2012 | Browne | B60R 21/013 701/117 |
| 8,554,461 B2* | 10/2013 | Cuddihy | B60R 21/0134 340/436 |
| 8,698,639 B2* | 4/2014 | Fung et al. | 340/576 |
| 9,047,780 B2* | 6/2015 | Guarnizo Martinez | B60W 10/18 |
| 9,132,774 B2* | 9/2015 | Kiefer | B60W 50/14 |
| 2001/0024032 A1 | 9/2001 | Breed et al. | |
| 2004/0080204 A1* | 4/2004 | Enomoto | B60R 21/013 297/480 |
| 2004/0216939 A1* | 11/2004 | Lorenz | B60R 21/015 180/268 |
| 2004/0243368 A1* | 12/2004 | Hiemer | B60W 40/02 703/8 |
| 2004/0252027 A1* | 12/2004 | Torkkola | G08B 21/06 340/576 |
| 2005/0030184 A1* | 2/2005 | Victor | B60K 28/06 340/576 |
| 2006/0097496 A1* | 5/2006 | Theisen | B60R 21/01554 280/735 |
| 2006/0195231 A1* | 8/2006 | Diebold | B60R 21/013 701/1 |
| 2006/0208169 A1* | 9/2006 | Breed | B60N 2/002 250/221 |
| 2006/0229784 A1* | 10/2006 | Bachmann | B60R 25/25 701/45 |
| 2006/0250297 A1* | 11/2006 | Prakah-Asante | B60R 21/0134 342/70 |
| 2006/0253240 A1* | 11/2006 | Rao | B60W 50/035 701/48 |
| 2007/0080825 A1* | 4/2007 | Shiller | B60R 21/013 340/903 |
| 2007/0114768 A1* | 5/2007 | Lennir | B60R 21/01548 280/735 |
| 2007/0219672 A1* | 9/2007 | Fehr | B60W 40/08 701/1 |
| 2007/0257474 A1* | 11/2007 | Eschbach | B60R 21/01516 280/735 |
| 2008/0080741 A1* | 4/2008 | Yokoo | B60W 40/09 382/104 |
| 2008/0084283 A1* | 4/2008 | Kalik | B60Q 9/00 340/435 |
| 2008/0147277 A1* | 6/2008 | Lu | B60W 30/085 701/45 |
| 2008/0255722 A1* | 10/2008 | McClellan | B60R 25/102 701/31.4 |
| 2008/0288143 A1* | 11/2008 | Smith | A61B 5/18 701/49 |
| 2009/0027188 A1* | 1/2009 | Saban | B60N 2/002 340/521 |
| 2009/0177359 A1* | 7/2009 | Ihara | B60R 21/0134 701/45 |
| 2009/0210115 A1* | 8/2009 | Gombert | B60R 22/44 701/45 |
| 2010/0066116 A1* | 3/2010 | Coenen | B60N 2/4214 296/65.01 |
| 2010/0198491 A1* | 8/2010 | Mays | B60W 30/09 701/124 |
| 2011/0015818 A1* | 1/2011 | Breuer | B60T 8/17558 701/31.4 |
| 2011/0254330 A1* | 10/2011 | Lich | B60N 2/0276 297/216.1 |
| 2012/0212353 A1* | 8/2012 | Fung | B60K 28/06 340/905 |
| 2012/0245491 A1* | 9/2012 | Amell | A61B 5/4561 600/595 |
| 2012/0296526 A1* | 11/2012 | Freienstein | B60R 19/26 701/45 |
| 2014/0336880 A1* | 11/2014 | Freienstein | B60R 21/0132 701/45 |

FOREIGN PATENT DOCUMENTS

| | | |
|---|---|---|
| DE | 10 2005 038226 | 2/2007 |
| EP | 1 752 339 A1 | 2/2007 |
| WO | WO 2004/103779 | 12/2004 |

OTHER PUBLICATIONS

"12. VDA Technischer Kongress 2010, Baumann et al.", "PRE-SAFE Pulse, die Erweiterung des Insassenschutzes durich Nutzung der Vorunfallphase".

* cited by examiner

METHOD FOR ACTIVATING A SAFETY ACTUATOR OF A MOTOR VEHICLE

BACKGROUND OF THE INVENTION

1. Field of the Invention

The present invention relates to a method for activating a safety actuator of a motor vehicle.

2. Description of the Related Art

In the field of safety technology of motor vehicles, it is known that a strength of an intervention of a safety system may be determined by taking into account an endangerment of the vehicle occupants, and/or a driving situation, and/or a present position of the vehicle seat.

For example, published international patent application document WO 2004/103779 A1 discloses an occupant protection system of a motor vehicle which transfers a vehicle seat into an impact-optimized position by quickly adjusting it.

A pre-triggering, propulsive system is furthermore known from "12. VDA Technischer Kongress 2010, Baumann et al.", "PRE-SAFE Pulse, die Erweiterung des Insassenschutzes durch Nutzung der Vorunfallphase," this system pre-accelerating an occupant of the motor vehicle in the case of a front impact of a motor vehicle during a pre-impact phase with the aid of an air bag or a seat belt in such a way that a speed due to an impact pulse and a speed of the pre-acceleration superimpose in a destructive manner.

Electromotive seat belt tensioners are known in motor vehicles, in particular of the upper classes. Furthermore, an anticipatory sensor system, e.g., a radar system for adaptive cruise control, is known in such motor vehicles as well as a braking action initiated automatically with the aid of an automatic braking device.

BRIEF SUMMARY OF THE INVENTION

It is the object of the present invention to provide an improved method for activating a safety actuator of a motor vehicle.

The object is achieved with the aid of a method for activating a safety actuator of a motor vehicle, including:
- ascertaining an endangerment model of the motor vehicle with the aid of an anticipatory sensor system and at least one characteristic value of a pose of the driver of the motor vehicle;
- ascertaining a controllability of the motor vehicle by a driver of the motor vehicle with the aid of the at least one characteristic value; and
- activating the safety actuator to an extent which is a function of the endangerment model and the controllability.

One advantage of the method according to the present invention is that a degree of an intervention by the safety actuator on the driver of the motor vehicle is a function of a controllability of the motor vehicle by the driver and is therefore readily influenceable. The controlled intervention by the safety actuator results in the driver being able to influence the operating elements of the motor vehicle and thus the driving behavior of the motor vehicle to the greatest extent possible, so that a possibly "excessive" intervention by the safety actuator into the driving operation does not take place or is strongly reduced. Due to the fact that the endangerment model is a function of at least one characteristic value of a pose of a driver of the motor vehicle, a triggering behavior of the safety actuator is advantageously made a function of the posture of the driver. In this way, the driver is able to maximize the safety level in the motor vehicle by assuming an advantageous posture.

One preferred specific embodiment of the method provides that the at least one characteristic value is defined by a degree of the driver's contact with a seat back of a vehicle seating device. This results in the advantage that the triggering behavior of the safety actuator may be easily improved to a noteworthy extent.

One advantageous refinement of the method provides that the at least one characteristic value is ascertained from an inclination of the seat back. Advantageously, a readily detectable variable is thus used to control a triggering behavior of the safety actuator.

One preferred refinement of the method proposes that the at least one characteristic value is ascertained with the aid of an ultrasonic sensor and/or with the aid of a contact sensor and/or with the aid of an optical detection device. In this way, the characteristic value of the pose of the driver may be advantageously ascertained for multiple different possibilities, whose modes of operation are combinable, whereby different embodiments of the triggering behavior of the safety actuator may be implemented as a function of a requirement profile. A scalability of a detection system for the quality of the pose is thereby implementable according to the requirement profile.

One preferred specific embodiment of the method proposes that the at least one characteristic value is defined by a positioning of a steering device by the driver, a deviation of the position from a predefined position being ascertained. The triggering behavior of the safety actuator may be advantageously easily optimized by minimizing the deviation degree of the position.

One preferred specific embodiment of the method provides that the posture of the driver is ascertained with the aid of a contact sensor and/or an angle sensor. In this way different possibilities of detecting the position of the steering device may be advantageously influenced, whereby the triggering behavior of the safety actuator may be effectively influenced.

One preferred specific embodiment of the method provides that a steering device angle is correlated with a yaw angle of the motor vehicle which is detected by a yaw-rate sensor. It is advantageously recognizable with the aid of this measure, whether a control of the steering device is in fact reduced by the driver or whether the driver carries out a steering movement which is deliberately intended.

One advantageous refinement of the method provides that a vehicle-seating-device based restraint means is adjusted when activating the safety actuator. Vehicle-seating-device based restraint means represent a noticeable portion of a protection potential by the safety actuator in the motor vehicle, so that by adjusting them according to the present invention, the driver's influence on the motor vehicle may be advantageously considerably increased.

It is preferably provided that at least one plane of the motor vehicle seating device is adjusted. In this way, a position of the driver within the motor vehicle may be advantageously changed in such a way that the driver may be transferred into an optimized position from the safety-critical viewpoint during a pre-impact phase.

One advantageous refinement of the method according to the present invention provides that the adjustment of the vehicle-seating-device based restraint means is carried out in interaction with the adjustment of a seat belt tensioner device of the motor vehicle. This makes it possible for the driver to be provided with an optimized influence on the motor vehicle, by taking into account the maximized safety aspects.

One advantageous refinement of the method according to the present invention provides a degree of an adjustment path and/or an adjustment speed of the vehicle-seating-device based restraint means as a function of the endangerment model and of the controllability of the motor vehicle. It is thus advantageously achieved that an intervention by the safety actuator on the driver and thus an intervention opportunity by the driver on the motor vehicle is optimized for the particular situation.

It is preferably provided that the anticipatory sensor system is used to ascertain a preliminary phase of a front and/or a side and/or a rear impact of the motor vehicle. In this way, the endangerment model of the motor vehicle is advantageously determined for preliminary phases of different accident scenarios, so that the intervention by the safety actuator is adjusted to the accident characteristic in an optimized manner.

One advantageous refinement of the method provides that the endangerment model is designed as a product of an impact probability by an impact severity of the motor vehicle ascertained in advance. In this way, the endangerment model of the motor vehicle is ascertained in advance depending on the individual driving situation, so that the triggering degree of the safety actuator is carried out in an optimized manner.

One advantageous refinement of the method provides that the method is implemented with the aid of an algorithm. This provides an easily applicable and easily adaptable way to carry out the method according to the present invention.

One advantageous refinement of the method proposes that a look-up table or an interpolation is used for switching between the supporting points of the algorithm. This makes it advantageously possible to switch between the supporting points of the algorithm in a simple manner, whereby an operative behavior of the algorithm may be easily adapted as desired.

Further features and advantages of the present invention will be elucidated below in greater detail based on multiple figures. The figures are used in particular to work out the principles which are essential to the present invention and are not conceived for the purpose of providing constructive details or concrete details of the method steps.

DETAILED DESCRIPTION OF THE INVENTION

Figure 1:
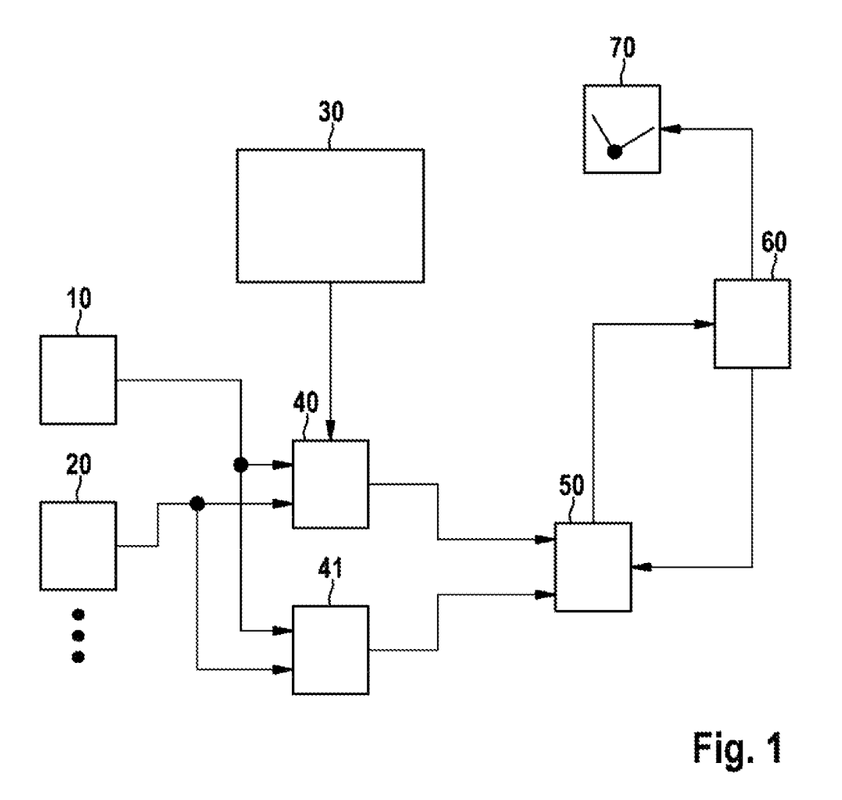
FIG. 1 shows a schematic block diagram of one specific embodiment of the method according to the present invention for activating a safety actuator of a motor vehicle.

FIG. 1 shows one specific embodiment of the method according to the present invention for activating a safety actuator of a motor vehicle. Here, an endangerment model 40 of the motor vehicle is ascertained with the aid of a situation recognition 30 having an anticipatory sensor system of the motor vehicle (e.g., a radar distance sensor system, camera in the bumper, etc.), as well as with the aid of a first characteristic value 10 of a pose of a driver of the motor vehicle (e.g., a degree of a contact of the driver with a seat back of a vehicle seat) and with the aid of a second characteristic value 20 of a pose of the driver of the motor vehicle (e.g., a quality of the way a steering wheel is held). Alternatively or additionally to first characteristic value 10 and second characteristic value 20, other characteristic values of a pose of a driver of the motor vehicle are also conceivable, which is indicated by dots in FIG. 1. A degree of an endangerment of the motor vehicle which is ascertained with the aid of the anticipatory sensor system may, for example, be ascertained from a product of an impact probability determined with the aid of the sensor system by an impact severity of the motor vehicle determined in advance with the aid of the sensor system.

An output variable of endangerment model 40 is supplied as an input variable to an algorithm 50, algorithm 50 being, for example, designed as an adjustment algorithm for a control unit 60 (e.g., an electronic vehicle seat control unit) of the motor vehicle. An output variable of algorithm 50 effects control unit 60 as an input variable by algorithm 50 predefining a setpoint value for control unit 60. Control unit 60 is coupled back to algorithm 50 through a transmission of an actual value to algorithm 50.

Control unit 60 activates a safety actuator 70 of the motor vehicle. Safety actuator 70 may, for example, be designed as a vehicle-seating-device based restraint means. The vehicle-seating-device based restraint means includes in the simplest case an adjustment of the seat adjustment planes, a seat height adjustment, a seat horizontal adjustment, an adjustment of the seating area inclination or seat back inclination, or also an adjustment of a headrest or a seat contour (e.g., through side bolsters) being provided. In more complex systems, the adjustment of the vehicle-seating-device based restraint means may be carried out in an interaction with a seat belt tensioner device of the motor vehicle (e.g., for the purpose of removing seat belt slacks). A diversified seat adjustment of the motor vehicle is carried out in the described manner based on concrete endangerment situations of the motor vehicle.

According to the present invention, a controllability 41 of the motor vehicle may also be used as an input variable for algorithm 50. Controllability 41 represents a degree as to what extent the motor vehicle may be controlled based on a quality of a seating position of the driver in a vehicle seat of the motor vehicle and is ascertained—similarly to endangerment model 40—with the aid of first characteristic value 10 and second characteristic value 20 of the pose of the driver of the motor vehicle. Controllability 41 is preferably estimated from characteristic values 10, 20 of the driver's pose with the aid of a state observer. In this way, another input variable in the form of an output variable of controllability 41 results for algorithm. 50 as the input variable, additionally to an output variable of endangerment model 40.

It is thus apparent from FIG. 1 that with the aid of the present invention, a refinement of algorithm 50 is achieved by using another input variable for algorithm 50 in the form of controllability 41. As a result of this measure, an output variable of algorithm 50 is also refined or improved in such a way that control unit 60 is able to categorize according to the particular situation concrete situations with the aid of the stated output variable prior to accidents and therefore implement a triggering strategy for downstream safety actuator 70. When carrying out algorithm 50, a look-up table may be used, for example, to switch between the supporting points of algorithm 50, or an interpolation may be used between the supporting points of algorithm 50.

Figure 2:
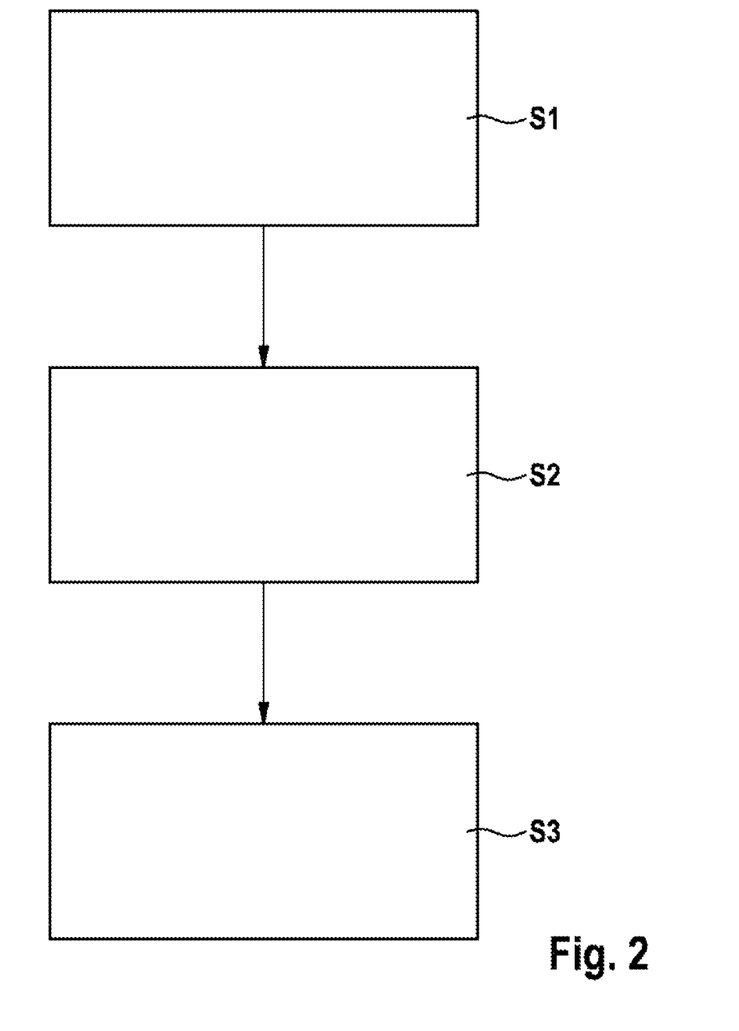
FIG. 2 shows a schematic flow chart of a specific embodiment of the method according to the present invention.

FIG. 2 shows a sequence of one specific embodiment of the method according to the present invention based on a highly simplified flow chart. In a first step S1, an endangerment model 40 of the motor vehicle is ascertained with the aid of an anticipatory sensor system and at least one characteristic value 10, 20 of a pose of a driver of the motor vehicle. In a second step S2, an ascertainment of a controllability 41 of the motor vehicle is carried out by a driver of the motor vehicle with the aid of at least one characteristic value 10, 20. Finally, in a third step S3, safety actuator 70 is activated to an extent which is a function of endangerment model 40 and controllability 41.

Figure 3A:
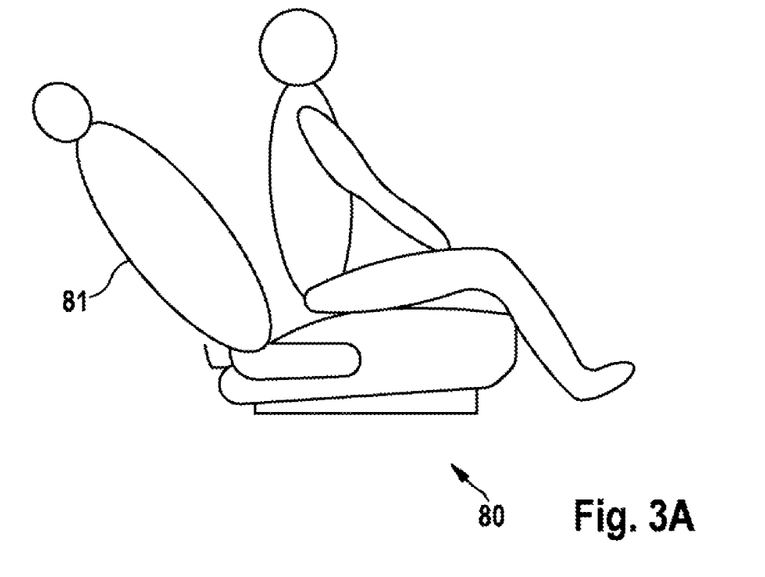
FIG. 3A and FIG. 3B show schematic representations of the poses of a driver of the motor vehicle.
Figure 3B:
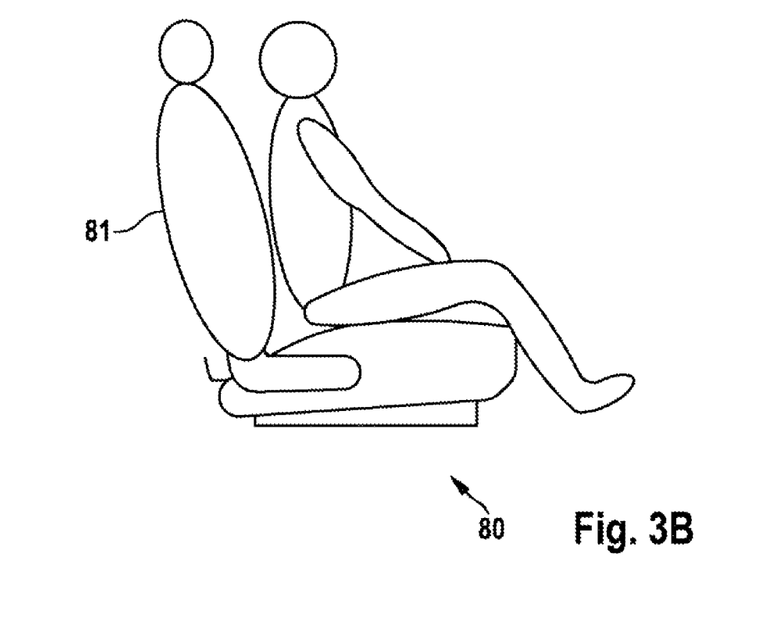

FIGS. 3A and 3B show highly simplified, schematic examples of a quality of a seating position of a driver in a vehicle seating device 80. It is apparent in FIG. 3A that a driver sits in a vehicle seating device 80 having seat back 81 inclining far back. This results in a bad seating position for the driver from the safety-critical viewpoint, since a back area of the driver has essentially no or only very little contact with seat back 81. Due to the resulting missing or very little support from seat back 81, the driver assumes an unstable posture which makes it difficult to carry out sudden steering and/or braking maneuvers. In the case of a strong triggering of a safety actuator 70, this would consequently result in already reduced controllability 41 of the motor vehicle by the driver being even further reduced or completely eliminated. The driver would thus have no chance of manually correcting or preventing an imminent accident situation.

In contrast, FIG. 3B indicates a schematic example of an improved seating position of the driver in vehicle seating device 80. It is apparent that seat back 81 is now inclined in such a way that a back area of the driver has contact with seat back 81. In this way, a system according to the present invention which activates safety actuator 70 may recognize that an essentially greater intervention by safety actuator 70 may be carried out in the seating position shown in FIG. 3B. This may be explained by the fact that controllability 41 of the motor vehicle is essentially sufficiently implemented by the stable seating position of the driver.

For ascertaining a pose or seating position/posture of the driver in vehicle seating device 80, multiple options may be provided. For example, contact sensors (e.g., capacitive contact sensors, not illustrated) or seat occupation mats may detect a type and a degree of a contact of a back area of the driver with seat back 81. With the aid of one or multiple capacitive sensors in seat back 81, the distance of the driver from seat back 81 of vehicle seating device 80 may also be detected. Furthermore, it is conceivable that an optical and/or an acoustic detection system, e.g., a video detection device or an ultrasonic sensor system, ascertain the seating position of the driver in vehicle seating device 80. One or multiple ultrasonic sensors or video cameras (not illustrated) which are present inside the motor vehicle may in this case detect the seating position of the driver alone or in combination with other information.

An angle of inclination of seat back 81 of vehicle seating device 80 may also be an indicator of controllability 41 of the motor vehicle by the driver. If, for example, seat back 81 is inclined too far, the arms of the driver are usually essentially straight. This generally strongly limits the driver's ability to move, which may have a negative effect on controllability 41 of the motor vehicle. Therefore, the angle of inclination of vehicle seating device 80 may be used as characteristic value 10, 20 for the pose of the driver and may be detected using the adjustment of vehicle seating device 80 or with the aid of an inclination sensor (not illustrated). The detected angle may, for example, be evaluated based on a tolerance band which defines an area between a maximum and a minimum angle of inclination.

Figure 4A:
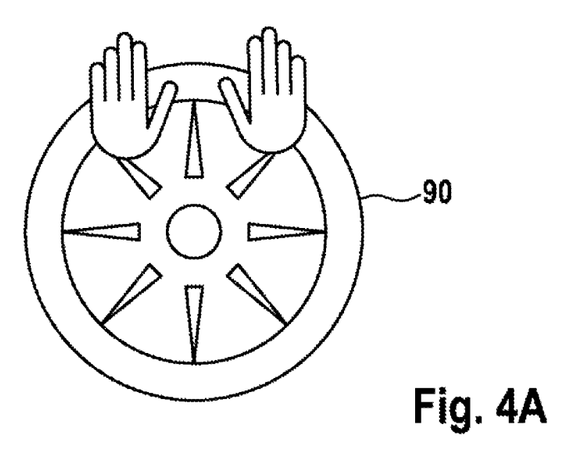
FIG. 4A and FIG. 4B show schematic representations of ways for a driver of a motor vehicle to hold a steering device.
Figure 4B:
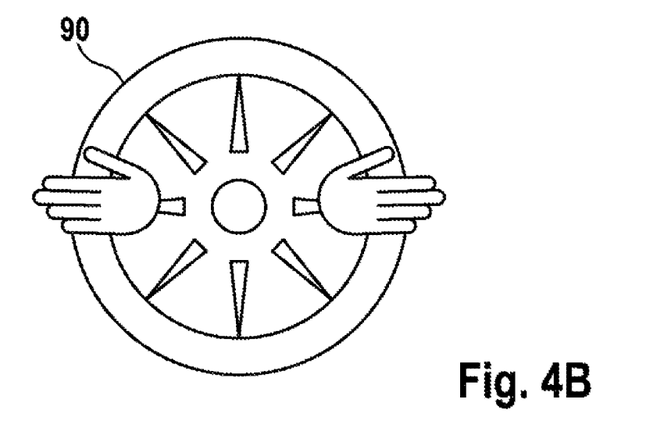

FIGS. 4A and 4B schematically illustrate a controllability 41 of the motor vehicle based on a quality of the way the driver holds a steering device 90 (e.g., a steering wheel) of the motor vehicle. It is apparent from FIG. 4A that the driver holds steering device 90 with both hands close to the top, which may mean that the arms of the driver are essentially straight. Therefore, it may be assumed that a controllability 41 of the motor vehicle by the driver is strongly reduced, which ultimately implies low quality of the way the steering wheel is held. In contrast, FIG. 4B indicates an "optimal" way to hold the steering wheel in which the two hands of the driver hold steering device 90 approximately at the positions "3 o'clock" and "9 o'clock." The intention is of course to be able to predefine the optimal way to hold the steering wheel, a deviation from the optimal way of holding possibly being incorporated in the method according to the present invention as one of characteristic values 10, 20. The deviation may, for example, be defined based on a tolerance band.

The position of the hands on steering device 90 may, for example, be detected with the aid of contact sensors (e.g., capacitive contact sensors, not illustrated). In this way, it is also possible to determine whether the driver uses one or both hands to hold the steering device. In addition, it could be ascertained whether the driver is shifting a transmission of the motor vehicle or is carrying out a deliberate steering movement ("reaching over" steering device 90). Information of this type may, for example, be obtained with the aid of a yaw-rate sensor (not illustrated) whose signal is correlated with a signal of a steering wheel angle sensor (not illustrated) for detecting an angle of steering device 90. Strong fluctuations at an increased frequency in an output signal of the steering wheel angle sensor may be an indication of a reduced vehicle control due to the driver's fatigue. According to the present invention, all stated parameters may be incorporated as characteristic values 10, 20 into the method according to the present invention for controlling a triggering strategy for safety actuator 70.

Figure 5:
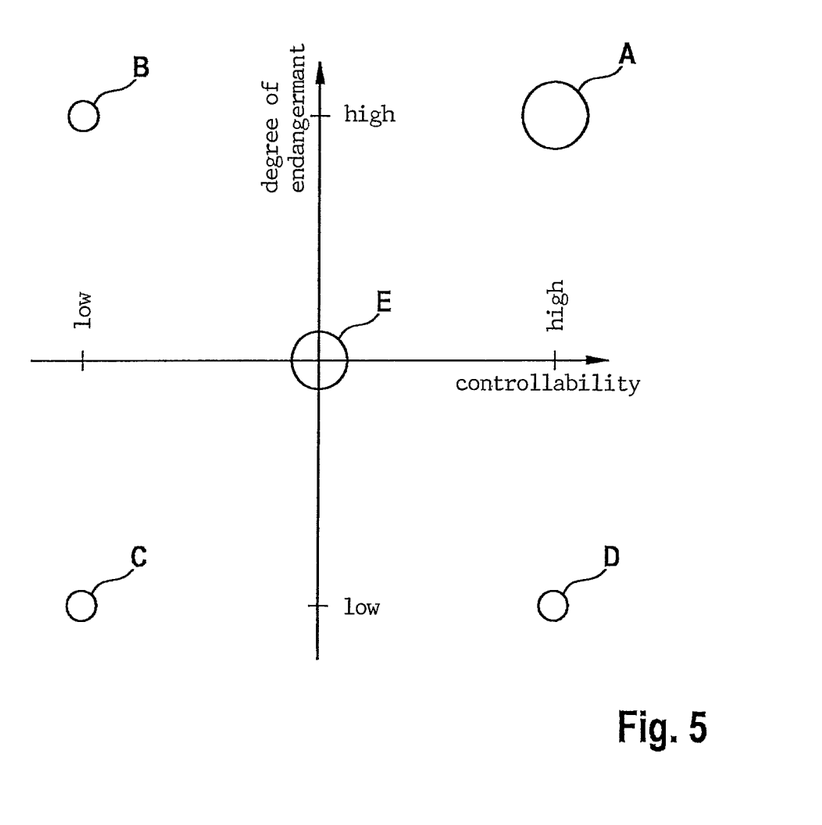
FIG. 5 shows a schematic representation of interventions according to the present invention by the safety actuator of a motor vehicle during a pre-accident phase of the motor vehicle.

Based on a schematic four-quadrant state diagram, FIG. 5 shows a schematic mode of operation of the method according to the present invention for activating safety actuator 70 of a motor vehicle. In the figure, a dependence of the intervention of safety actuator 70 on the two parameters "degree of endangerment" and "controllability" is illustrated at five supporting points as an example.

The x axis of the diagram scales a controllability of the motor vehicle, and the y axis of the diagram scales a degree of an endangerment of the motor vehicle which is ascertained with the aid of situation recognition 30 using an anticipatory sensor system. In the first quadrant of the diagram of FIG. 5, a state of a high controllability 41 and a high endangerment degree of the motor vehicle are indicated. As a result therefrom, an intervention A into a safety actuator 70 of the motor vehicle or a supporting point A of algorithm 50 (e.g., adjustment paths/adjustment speed of vehicle seats) may be strongly pronounced. This is indicated graphically by a large circumference or a large circle diameter of intervention A. Intervention A, which is strong per se, may cause increased interaction between the motor vehicle and the driver, which in this case has no negative effect insofar that a high degree of controllability 41 of the motor vehicle, i.e., an essentially stable driving situation, is present at the point in time of triggering of safety actuator 70.

In the second quadrant of the diagram of FIG. 5, states of a high endangerment and a low controllability of the motor vehicle are indicated. As a result therefrom, an intervention B by safety actuator 70 (or a supporting point B of algorithm 50) into the motor vehicle is small. This is indicated by a small circumference or a small circle diameter of intervention B.

In the third quadrant of the diagram of FIG. 5, states of a low endangerment and a low controllability of the motor vehicle are indicated schematically. As a result therefrom, an intervention by safety actuator 70 or a supporting point C of algorithm 50 is small, which is indicated by a graphic illustration (small circumference, small circle diameter) of intervention C.

In the fourth quadrant of the diagram of FIG. 5, states of a high controllability and a low endangerment of the motor vehicle are indicated. As a result therefrom, an intervention D by safety actuator 70 of the motor vehicle or a supporting point D of algorithm 50 is small. This is indicated by a graphic illustration (small circumference, small circle diameter) of intervention D.

In a state which corresponds to a point of intersection between the x and the y axes, a medium controllability and a medium degree of endangerment of the motor vehicle are present. In this case, an intervention E by safety actuator 70 or a supporting point E of algorithm 50 is medium-large in relation to interventions A, B, C, D. This is indicated by a graphic illustration (medium-large circumference, medium-large circle diameter) of intervention E.

It is thus apparent from FIG. 5 that interventions by safety actuator 70 may also be completely suppressed under certain circumstances. In the case of a high controllability 41 of the motor vehicle, a degree of the intervention by safety actuator 70 is accordingly strongly dependent on the endangerment of the motor vehicle. In the case of a high endangerment, a very strong intervention (intervention A) may be carried out which may even go as far as to a pre-accelerating system.

A driver of the motor vehicle is advantageously not unnecessarily irritated by the method according to the present invention during the driving operation so that a dangerous driving situation may potentially still be corrected by a manual influence of the driver (e.g., by a strong steering intervention or an actuation of the brake pedal of the motor vehicle, etc.). An intervention by safety actuator 70 which is adequate to the situation provides the driver with an opportunity to still evade a dangerous accident situation by personal intervention (e.g., steering, braking).

The intention is naturally to control, trigger, or activate any type of safety actuator 70 with the aid of the method according to the present invention. The above-described adjustment of a vehicle-seat based restraint means is therefore to be considered to be only one of many possible examples of safety actuator 70 and may be supplemented or replaced by any existing safety actuator 70 or by a safety actuator yet to be developed in the future.

In the case of the vehicle-seating-device based restraint means, an increasing intervention degree of safety actuator 70 may mean an enlargement of the adjustment paths or an enlargement of the adjustment speed of vehicle seating device 80 which is coupled with an electromotive action of the seat belt tensioner device under certain circumstances. Furthermore, the intervention degree may be a function of an instantaneous seating position of the driver and an adjustment device of the vehicle-seat based restraint means.

To sum up, the present invention provides a method for activating a safety actuator of a motor vehicle which controls and utilizes present and adapted safety systems or actuators in the motor vehicle in an optimized manner. The method according to the present invention for triggering or activating the safety actuator uses, in particular, specific information which defines the ability of a driver to control the motor vehicle at the point in time of triggering the safety actuator based on a pose in a driver's seat. A quality of such a controllability is in this case directly proportional to a quality of a seating position.

In this way, it is advantageously possible to mitigate negative effects of erroneous classifications of the existing safety systems. Therefore, the possibility of the driver losing control of the vehicle which is no longer reversible under certain circumstances and which may be triggered, for example, by pulling away the steerer from the steering wheel due to the driver's seat rolling back is prevented or its effect is strongly reduced.

It is obvious to those skilled in the art that features of the present invention may be altered and combined in a suitable manner, without departing form the core of the present invention. In particular, the system according to the present invention is suitable for any type of safety actuator of the motor vehicle, e.g., also for a safety actuator for influencing a steering and/or a braking and/or a speed behavior of the motor vehicle. Naturally, the described principles for detecting the seating position are only examples and may be supplemented or replaced by any suitable physical sensor systems.

What is claimed is:

1. A method for activating a safety actuator of a motor vehicle, comprising:
    ascertaining an endangerment model of the motor vehicle with the aid of an anticipatory sensor system and at least one characteristic value of a pose of a driver of the motor vehicle, wherein the endangerment model indicates a degree of endangerment;
    ascertaining, with the aid of the at least one characteristic value, a controllability of the motor vehicle by the driver; and
    activating the safety actuator to intervene in a driving operation, wherein the safety actuator is activated to an extent which is a function of the ascertained endangerment model and the ascertained controllability, and wherein the activating of the safety actuator varies as a function of the ascertained controllability, which ranges from low to high, and as a function of the degree of endangerment, such that when the ascertained controllability is high, a strength with which the safety actuator is activated increases with the degree of endangerment, and wherein when the ascertained controllability is low, the strength with which the safety actuator is activated is weakest.

2. The method as recited in claim 1, wherein the at least one characteristic value is defined by a degree of a contact of the driver with a seat back of a driver seat.

3. The method as recited in claim 2, wherein the at least one characteristic value is ascertained from an inclination of the seat back.

4. The method as recited in claim 1, wherein the at least one characteristic value is ascertained with the aid of at least one of an ultrasonic sensor, a contact sensor, and an optical detection device.

5. A method for activating a safety actuator of a motor vehicle, comprising:

ascertaining an endangerment model of the motor vehicle with the aid of an anticipatory sensor system and at least one characteristic value of a pose of a driver of the motor vehicle;

ascertaining, with the aid of the at least one characteristic value, a controllability of the motor vehicle by the driver; and activating the safety actuator to an extent which is a function of the ascertained endangerment model and the ascertained controllability, wherein a deviation between a predefined reference manner of holding a steering device of the motor vehicle and an actual manner in which the driver holds the steering device is ascertained, and wherein the at least one characteristic value represents the ascertained deviation.

6. The method as recited in claim 5, wherein the pose is ascertained with the aid of at least one of a contact sensor and an angle sensor.

7. The method as recited in claim 5, wherein an angle of the steering device is correlated with a yaw angle of the motor vehicle which is detected by a yaw-rate sensor.

8. The method as recited in claim 5, wherein a vehicle-seating-device based restraint unit is adjusted when the safety actuator is activated.

9. The method as recited in claim 8, wherein at least one plane of a driver seat is adjusted.

10. The method as recited in claim 8, wherein the adjustment of the vehicle-seating-device based restraint unit is carried out in interaction with an adjustment of a seat belt tensioner device of the motor vehicle.

11. The method as recited in claim 8, wherein at least one of an adjustment path and an adjustment speed of the vehicle-seating-device based restraint unit is determined as a function of the endangerment model and the controllability of the motor vehicle.

12. The method as recited in claim 8, wherein the anticipatory sensor system ascertains a preliminary phase of at least one of a front, side, and rear impact of the motor vehicle.

13. The method as recited in claim 11, wherein the endangerment model is formed as a product of an impact probability and an impact severity of the motor vehicle ascertained in advance.

14. A non-transitory computer-readable data storage medium storing a computer program having program codes which, when executed on a computer, performs a method for activating a safety actuator of a motor vehicle, the method comprising:

ascertaining an endangerment model of the motor vehicle with the aid of an anticipatory sensor system and at least one characteristic value of a pose of a driver of the motor vehicle, wherein the endangerment model indicates a degree of endangerment;

ascertaining, with the aid of the at least one characteristic value, a controllability of the motor vehicle by the driver; and activating the safety actuator to intervene in a driving operation, wherein the safety actuator is activated to an extent which is a function of the ascertained endangerment model and the ascertained controllability, and wherein the activating of the safety actuator varies as a function of the ascertained controllability, which ranges from low to high, and as a function of the degree of endangerment, such that when the ascertained controllability is high, a strength with which the safety actuator is activated increases with the degree of endangerment, and wherein when the ascertained controllability is low, the strength with which the safety actuator is activated is weakest.

15. The method as recited in claim 1, wherein the intervention by the safety actuator is strongest when the degree of endangerment and the controllability are both high.

* * * * *